(12) United States Patent
Glückler et al.

(10) Patent No.: US 11,472,277 B2
(45) Date of Patent: Oct. 18, 2022

(54) DRIVE ARRANGEMENT FOR AN ELECTRIC VEHICLE AND METHOD FOR POWER SHIFTING

(71) Applicant: ZF Friedrichshafen AG, Friedrichshafen (DE)

(72) Inventors: Johannes Glückler, Friedrichshafen (DE); Kai Bornträger, Langenargen (DE); Stefan Renner, Bodman-Ludwigshafen (DE); Stefan Spühler, Friedrichshafen (DE); Michael Trübenbach, Friedrichshafen (DE); Johannes Kaltenbach, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 17/081,204

(22) Filed: Oct. 27, 2020

(65) Prior Publication Data
US 2021/0123512 A1    Apr. 29, 2021

(30) Foreign Application Priority Data
Oct. 28, 2019    (DE) .................... 10 2019 216 562.1

(51) Int. Cl.
*B60K 1/02* (2006.01)
*F16H 3/72* (2006.01)

(52) U.S. Cl.
CPC ............... *B60K 1/02* (2013.01); *F16H 3/727* (2013.01); *F16H 2200/0021* (2013.01);
(Continued)

(58) Field of Classification Search
CPC ................. F16H 2200/0034–0039; F16H 2200/2033–2038; F16H 2200/2007;
(Continued)

(56) References Cited

U.S. PATENT DOCUMENTS 2,037,126 A * 4/1936 Ford .................... B60K 5/1225
248/605
5,879,265 A    3/1999 Bek
(Continued)

FOREIGN PATENT DOCUMENTS

CN    208630340 U    3/2019
DE    19619321 A1    11/1997
(Continued)

OTHER PUBLICATIONS

German Search Report issued in corresponding German Patent Application No. 10 2019 216 562.1 dated Jan. 21, 2021.

*Primary Examiner* — Ernesto A Suarez
*Assistant Examiner* — James J Taylor, II
(74) *Attorney, Agent, or Firm* — Finch & Maloney PLLC; Jay S. Franklin; Michael J. Bujold

(57) ABSTRACT

A drive arrangement for an element vehicle, having first and second drive wheels (R1, R2), a first electric machine (EM1) and a second electric machine (EM2) with a common rotational axis (m), a manual transmission (G3) with a transmission input shaft (EW) and a transmission output shaft (AW) and an axle differential (DI) with a differential input (DIK) and two differential output shafts (3a, 3b). The first electric machine (EM1) is connected to the transmission input shaft (EW) and the transmission output shaft (AW) is connected to the differential input (DIK), and the second electric machine (EM2) can, if necessary, be engaged as an additional drive.

21 Claims, 2 Drawing Sheets

(52) U.S. Cl.
CPC ............... *F16H 2200/0034* (2013.01); *F16H 2200/0039* (2013.01); *F16H 2200/2007* (2013.01); *F16H 2200/2041* (2013.01); *F16H 2200/2043* (2013.01); *F16H 2200/2094* (2013.01); *F16H 2200/2097* (2013.01)

(58) Field of Classification Search
CPC ..... F16H 2200/2064; F16H 2200/2094; F16H 2200/2097; F16H 3/727–728; B60K 1/02
See application file for complete search history.

(56) References Cited

U.S. PATENT DOCUMENTS

| | | | | |
|---|---|---|---|---|
| 6,557,656 B2* | 5/2003 | Haniu | ............... | B60K 6/365 180/65.6 |
| 7,220,203 B2* | 5/2007 | Holmes | ............... | B60K 6/48 475/5 |
| 7,363,996 B2* | 4/2008 | Kamada | ............... | B60L 50/61 903/917 |
| 7,479,081 B2* | 1/2009 | Holmes | ............... | B60K 6/547 475/5 |
| 7,594,869 B2* | 9/2009 | Holmes | ............... | B60K 6/40 475/5 |
| 7,695,387 B2* | 4/2010 | Oba | ............... | B60K 6/445 475/5 |
| 7,967,711 B2* | 6/2011 | Conlon | ............... | F16H 3/728 475/5 |
| 8,091,661 B2* | 1/2012 | Oba | ............... | B60K 6/387 180/65.25 |
| 8,512,187 B2* | 8/2013 | Puiu | ............... | B60W 20/30 475/5 |
| 9,566,857 B1* | 2/2017 | Pritchard | ............... | B60K 6/387 |
| 10,968,983 B2* | 4/2021 | Hara | ............... | B60K 17/02 |
| 11,002,350 B2* | 5/2021 | Waltz | ............... | B60K 17/08 |
| 2019/0263243 A1 | 8/2019 | Kurth | | |
| 2019/0344660 A1* | 11/2019 | Kumar | ............... | B60K 7/0007 |
| 2020/0282827 A1 | 9/2020 | Kaltenbach et al. | | |

FOREIGN PATENT DOCUMENTS

| | | | |
|---|---|---|---|
| DE | 102012204717 A1 | 9/2013 | |
| DE | 102018001508 B3 * | 5/2019 | ............ B60K 17/08 |
| DE | 10 2019 202 994 A1 | 9/2020 | |

* cited by examiner

DRIVE ARRANGEMENT FOR AN ELECTRIC VEHICLE AND METHOD FOR POWER SHIFTING

This application claims priority from German patent application serial no. 10 2019 216 562.1 filed Oct. 28, 2019.

FIELD OF THE INVENTION

The invention relates to a drive arrangement for an electric vehicle, which comprises a first and a second drive wheel with wheel axles, a first and a second electric machine with a common rotational axis, a manual transmission with a transmission input shaft and a transmission output shaft and an axle differential. The invention also relates to a method for carrying out shifts under load (powershift method) by means of a shifting device and a coupling device of the manual transmission.

BACKGROUND OF THE INVENTION

In an earlier application with the file number 10 2019 202 994.9 a drive unit for an electric vehicle with an electric machine and a three-gear or two-gear transmission is disclosed, wherein a shifting device with three or two shifting elements is provided for engaging three or two gears. By omitting one shifting element the three-gear transmission can be used as a two-gear transmission. The transmission comprises two planetary gearsets coupled to one another, wherein the first planetary gearset is driven via its sun shaft (transmission input shaft) by the electric machine, whereas the ring gear shaft of the first planetary gearset is held fast. By way of its carrier shaft, the first planetary gearset is coupled to the ring gear shaft of the second planetary gearset. The carrier shaft of the second planetary gearset forms the transmission output shaft. The three or two shifting elements are integrated in a sliding sleeve, which can move axially on the sun shaft of the second planetary gearset, such that for the three-gear transmission there are a total of five positions, namely three shift positions and two neutral positions. In the earlier application a drive axle with drive wheels is also disclosed, in which the drive unit serves as the drive input and drives an axle differential arranged between the drive wheels. The transmission output shaft of the drive unit is thus connected to the differential input, the differential cage. With this drive axle, which comprises only one electric drive machine and only one transmission and an axle differential, powershifts are not possible. Due to the shifting elements made in the form of claws, the shifts take place with traction force interruption. The aforesaid earlier application is to its full extent included in the disclosure content of the present application and will be referred to in what follows as the earlier application for short.

SUMMARY OF THE INVENTION

Starting from the earlier application, the present invention aims to make the most of further potentials.

The invention includes the characteristics specified in the independent claim(s). Advantageous design features emerge from the subordinate claims.

According to the invention, in the drive arrangement mentioned at the beginning an electric vehicle is provided with two electric machines and a manual transmission, and with an axle differential, the first electric machine driving the axle differential via the transmission while the second electric machine can be engaged as necessary. Advantageously in this case, the second electric machine can be used on the one hand to reinforce the drive power, i.e. to assist the first electric machine, and/or on the other hand to support the traction force during shift processes. Due to the structure of the shifting elements as claws, without the second electric machine a traction force interruption would take place. When the second electric machine is engaged, during the shifting process power flows from the second electric machine to the transmission so that no traction force interruption takes place, i.e. powershifts are possible. It is also advantageous that although the drive axle has two electric machines, only one transmission is needed.

According to an advantageous design the transmission is in the form of a three-gear manual transmission with three shifting elements and two planetary gearsets coupled to one another, which form a gearset. The gearset comprises a first and a second planetary gearset, each with three shafts, two of which, namely the first carrier shaft and the second sun shaft are connected solidly and permanently to one another and form a coupling shaft. The second ring gear shaft is held fixed; the first sun shaft is driven by the first electric machine.

In further preferred embodiments the first ring gear shaft is coupled to the housing for engaging the first gear. To engage the second gear, the first ring gear shaft is coupled to the second carrier shaft. To engage the third gear, the carrier shaft and the ring gear shaft of the first planetary gearset are coupled to one another, i.e. the first planetary gearset is blocked, whereas two further blocking variants are possible, namely the carrier shaft with the sun shaft and the sun shaft with the ring gear shaft. The shifts take place in each case by way of a first shifting element (first gear), a second shifting element (second gear) and a third shifting element (third gear), which form a shifting device.

In a further preferred embodiment the transmission is a two-gear transmission in which the first gear is engaged by means of the second shifting element and the second gear by means of the third shifting element. Thus, compared with the three-gear manual transmission, in the two-gear transmission only the first shifting element has been omitted. Otherwise, the two-gear transmission comprises the same gearset as the three-gear transmission.

According to a further preferred embodiment the shifting elements are in the form of unsynchronized claws, these being robust and inexpensive shifting elements.

In a further preferred embodiment, the first electric machine can be decoupled, for which purpose the shifting device has at least one neutral position. By virtue of this decoupling the electric vehicle can roll freely without the resistance of the co-rotating electric machine.

According to another preferred embodiment, the three shifting elements are integrated in a sliding sleeve, this sliding sleeve being arranged and able to move on a shaft, namely the ring gear shaft of the first planetary gearset. In that way all the shifting and neutral positions (five positions) can be selected by means of a sliding sleeve and actuated by means of only one actuator.

In a further preferred embodiment, associated with the second electric machine there is a coupling device with two coupling positions and one neutral position. This makes it possible, as necessary, to route the power of the second electric machine to the transmission along two different paths.

According to a further preferred embodiment, in a first coupling position the second electric machine is connected directly to the transmission input shaft. In that way the powers or torques of the two electric machines are summed.

With this coupling the two machines have the same rotational speed, and if the electric machines are the same, they deliver twice the drive power and twice the torque to the differential input.

In a further preferred embodiment, in a second coupling position the second electric machine is coupled to the ring gear shaft of the first planetary gearset. In that way the power of the second electric machine flows along a second path to the transmission, so that superimposed operation is obtained: the torque of the first and the second electric machines are merged via the ring gear shaft and the sun shaft in the first planetary gearset and are summed in the carrier shaft. In this coupling position traction force support during shifts in the transmission can be achieved. If during a shifting process when passing through the neutral position a traction force interruption would take place, the second electric machine provides support via the first ring gear shaft so that no traction force interruption takes place at the transmission output shaft. Accordingly, powershifts are possible.

In a further preferred embodiment the coupling device has a neutral position in which the second electric machine can be decoupled, i.e. not entrained. Thus, drag losses are avoided.

In a further preferred embodiment, the common rotational axis of the electric machines is arranged perpendicularly to the wheel axles, i.e. in the longitudinal direction of the electric vehicle, so that the axle differential is driven by the transmission output shaft via a bevel-gear drive. This drive arrangement is called a central drive, wherein the electric machines and the transmission are arranged away from the axis of the vehicle, which contains only the axle differential and the drive wheels. The two electric machines can be the same as or different from one another with regard to type, power, rotational speed, torque and/or efficiency range.

According to another aspect of the invention, in a method for carrying out shifts under load, a so-termed powershift method, it is provided that the first electric machine is operated as the main drive machine and the second electric machine can be brought into play to support the traction force during shifting processes. In that way the advantage of a powershift, i.e. a shift without traction force interruption is achieved.

In a preferred variant of the method, to prepare for a shift in the transmission the first ring gear shaft is coupled to the second electric machine. In that way additional power flows into the transmission and during the shifting process, in particular when passing through the neutral position, the second electric machine provides support. Thus, no traction force interruption takes place.

According to a further preferred variant of the method, during shifting processes the shifting elements are synchronized by the second electric machine. In that way jerk-free, material-preserving shifts, i.e. closing of the shifting elements when their rotational speeds are synchronized, can be carried out.

In a further preferred variant of the method, after the end of the shifting process, i.e. after the gear has been engaged, the second electric machine can be decoupled when its power is no longer needed.

BRIEF DESCRIPTION OF THE DRAWINGS

Example Embodiments of the Invention are Illustrated in the Drawing and Will be Described in Greater Detail Below, so that from the Description and/or the Drawing Further Features and/or Advantages can Emerge. The Drawing Shows.

DETAILED DESCRIPTION OF THE PREFERRED EMBODIMENTS

Figure 1:
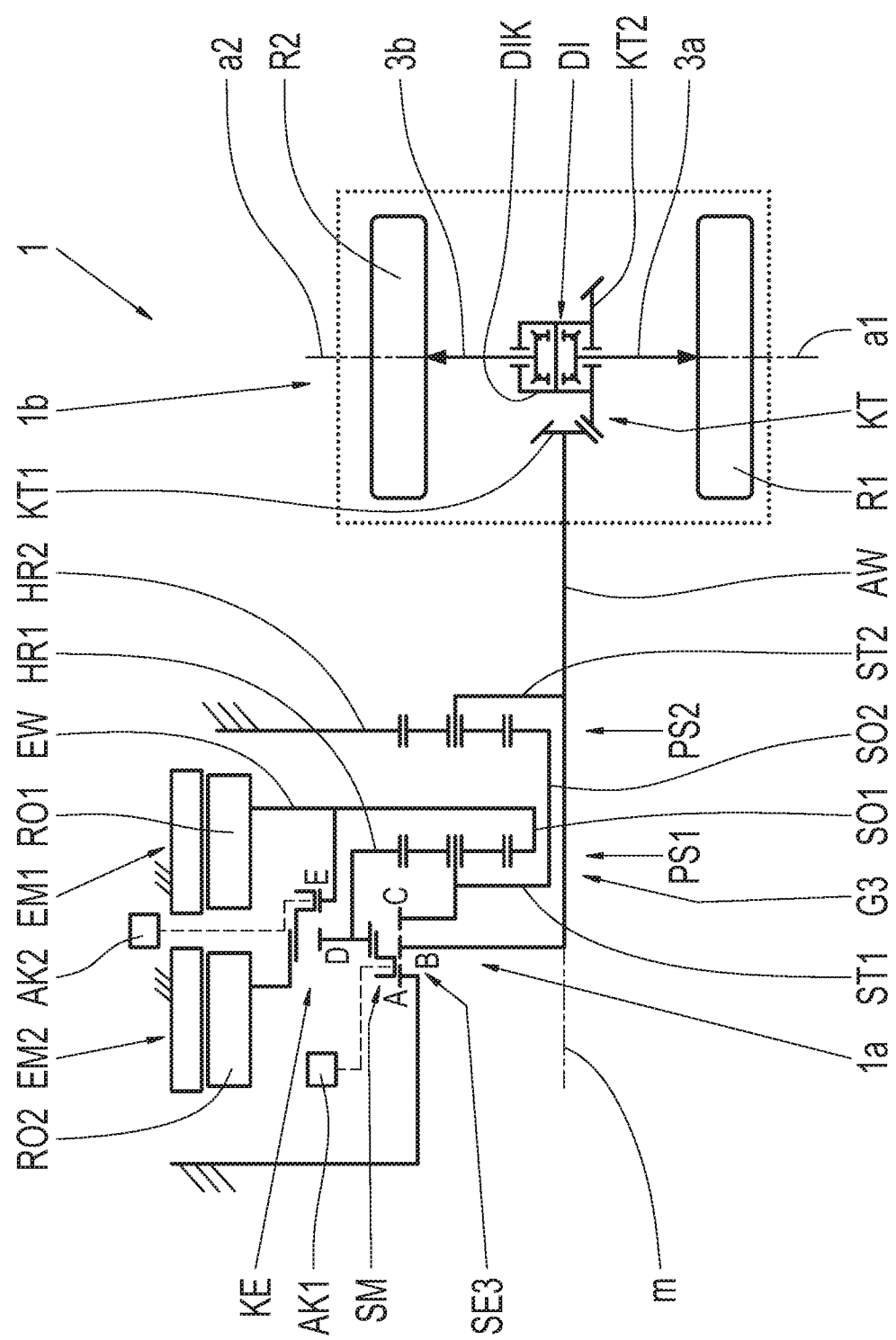
FIG. 1: A first drive arrangement for an electric vehicle, as a central drive with two electric machines and a three-gear transmission.

As a first example embodiment of the invention, FIG. 1 shows a first drive arrangement 1 of a vehicle that can be driven electrically, called an electric vehicle for short in what follows, which arrangement is designed as a so-termed central drive. The drive arrangement 1 comprises on the one hand a drive unit 1a, which comprises a first electric machine EM1 with a first rotor RO1, a second electric machine EM2 with a second rotor RO2, a three-gear manual transmission G3 with a shifting device SE3, and a coupling device KE. The electric machines EM1, EM2 have a common rotational axis m that extends in the longitudinal direction of the electric vehicle. The rotational axis m is at the same time the axis of symmetry of the transmission G3, of which only the upper half is shown. The drive arrangement 1 also comprises a conventional vehicle axle 1b with a first drive wheel R1 and a second drive wheel R2, and two differential output shafts 3a, 3b that drive the drive wheels R1, R2. The wheel axles a1, a2 are arranged transversely to the rotational axis m. The axle differential DI has a differential input or differential cage DIK, which is driven by a bevel drive KT consisting of a bevel gear pinion KT1 and a crown wheel. KT2.

The shifting device SE3 can be actuated by a first actuator AK1 and the coupling device KE by a second actuator AK2. The shifting device SE3 comprises three shifting elements for engaging three gears, namely a first shifting element A, a second shifting element B and a third shifting element C. All three gears can be engaged by virtue of a sliding sleeve SM. The coupling device comprises two coupling elements, a first coupling element D and a second coupling element E, for connecting the second electric machine EM2.

Figure 2:
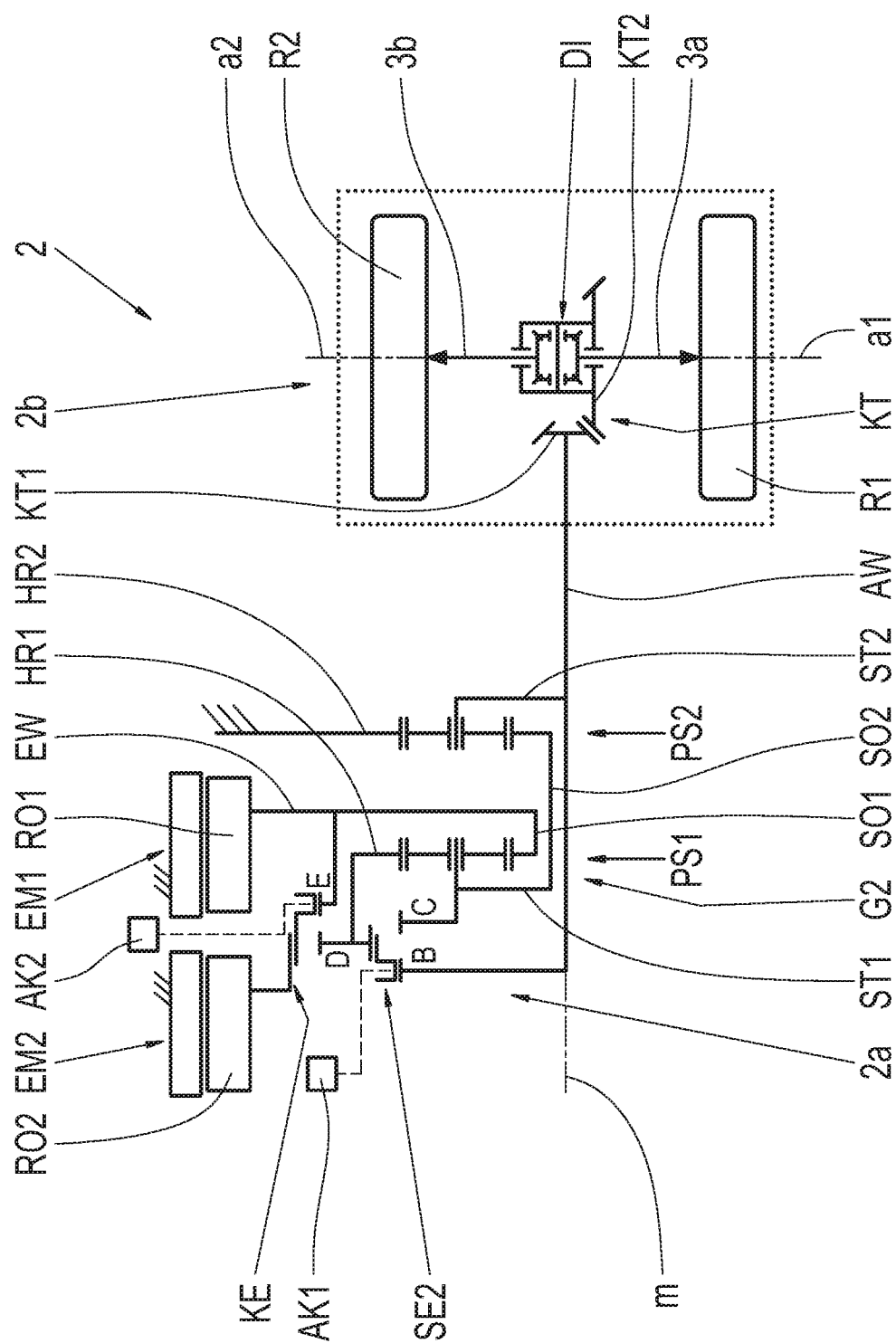
FIG. 2: A second drive arrangement, as a central drive with a two-gear transmission.

The three-gear manual transmission G3, called the transmission G3 for short in what follows, comprises two mutually coupled planetary gearsets, a first planetary gearset PS1 with a first sun shaft SO1, a first carrier shaft ST1 and a first ring gear shaft HR1, and a second planetary gearset PS2 with a second carrier shaft ST2, a second ring gear shaft HR2 fixed to the housing and a second sun shaft SO2, which is connected solidly and permanently to the first carrier shaft ST1 and which forms a coupling shaft between the two planetary gearsets PS1, PS2. The first sun shaft SO1 is connected fast to the first rotor RO1 and thus forms the transmission input shaft EW of the transmission G3. The second carrier shaft ST2 forms the transmission output shaft AW, which via the bevel drive KT drives the axle differential DI. The two planetary gearsets PS1, PS2 form a gearset, which can also be used for a two-gear transmission G2 (FIG. 2).

With the shifting device SE3 three gears can be engaged. To engage the first gear, the first ring gear shaft HR1 is coupled by the first shifting element A to the housing, as represented by hatching, i.e. it is held fixed. Thus, the two planetary gearsets PS1, PS2 each run with fixed gear ratios, which when multiplied by one another give the gear ratio of the first gear.

By closing the second shifting element B, whereby the second gear is engaged, the first ring gear shaft HR1 is coupled to the second carrier shaft ST2. Thus there is a dual coupling between the first planetary gearset PS1 and the second planetary gearset PS2, whereby superposed operation is obtained.

By closing the third shifting element C, whereby the third gear is engaged, the first planetary gearset PS1 is blocked so that basically two of the three shafts SO1, HR1, ST1 can be coupled to one another. In the example embodiment shown, the first carrier shaft ST1 is coupled to the first ring gear shaft HR1. By virtue of the blocking the first planetary gearset PS1 rotates as a block, i.e. with a gear ratio of 1:1, so that the gear ratio of the third gear is given by the fixed gear ratio of the second planetary gearset PS2.

The shifting elements A, B, C are preferably in the form of unsynchronized claws, although basically frictional, synchronized shifting elements can also be used for the shifting functions described. The transmission G3, between the three shifting positions, in which either the first shifting element A or the second shifting element B or the third shifting element C is closed, has two neutral positions in which the first electric machine EM1 is decoupled from the transmission G3. This enables so-termed coasting operation, i.e. free rolling of the electric vehicle without losses due to the co-rotation of the first electric machine EM1.

As mentioned above, the first ring gear shaft HR1 of the first planetary gearset PS1 is involved in all three shifting positions—and therefore all the shifting elements, i.e. the first, second and third shifting elements A, B, C can be integrated in a single sliding sleeve SM which is connected rotationally fixed to the first ring gear shaft HR1 in all the shifting positions. The sliding sleeve SM is actuated by a single actuator AK1. Since the gears one to three can be engaged one after another by moving the sliding sleeve SM in one direction, in each case via neutral positions, the possibility exists of synchronizing the shifting elements.

The second electric machine EM2 can be engaged or decoupled by means of the coupling device KE. The coupling device KE comprises a first coupling element D and a second coupling element E. By means of the second coupling element E, the second electric machine EM2 or its rotor RO2 is coupled to the input shaft EW of the transmission G3. By virtue of this coupling of the two rotors RO1, RO2 the two electric machines EM1, EM2 run at the same rotational speed. Thus, the second electric machine EM2 boosts the drive power, which—if the electric machines EM1, EM2 are the same—can be doubled.

By means of the first coupling element D, the second electric machine EM2 is connected to the first ring gear shaft HR1. Thus, the power of the second electric machine EM2 flows along a second path to the transmission G3; the power flows of the two electric machines EM1, EM2 are superimposed in the first planetary gearset PS1 and are transmitted to the second planetary gearset PS2 via the coupling shaft ST1/SO2.

According to the invention, with the first coupling element D of the coupling device KE traction force support during shifting is achieved, whereby powershifts are enabled by the transmission G3. For example, if during a shift, i.e. the engagement of a new gear, the power flow from the first electric machine EM1 is interrupted, then torque fed in from the second electric machine EM2 is applied at the ring gear shaft HR1 of the first planetary gearset PS1, which torque maintains the traction force in the drive output shaft AW or the second carrier shaft ST2. Shifting without a traction force interruption is also called a powershifting process, which will be described in greater detail below.

The powershifting process according to the invention assumes that the first electric machine EM1 acts as the main drive machine, since it is connected solidly to the transmission G3 by way of the transmission input shaft EW. To assist the shifts, the second electric machine EM2 is connected, in a preparatory manner, to the first ring gear shaft HR1.

Below, the shifting process from the first to the second gear is described, wherein first of all the first shifting element A of the shifting device SE3 is opened and then the second shifting element B is closed. Starting from the situation that the second electric machine EM2 has previously been connected to the transmission input shaft EW, i.e. both electric machines EM1 and EM2 together are driving, the load on the second electric machine EM2 is first reduced. Then, the second coupling element E of the coupling device KE is opened and the first coupling element D is synchronized with the second electric machine EM2, i.e. in this case braked to zero rotational speed. Then the first coupling element D is closed and the second electric machine EM2 is connected to the first ring gear shaft HR1. After that, by means of the second electric machine EM2, torque is built up so that the first shifting element A, which acts as a brake, is relieved. If the second electric machine EM2 cannot deliver enough torque, the torque of the first electric machine EM1 is reduced correspondingly. Then the first shifting element A is opened. The torques of the first and second electric machines EM1, EM2 are controlled or regulated in such manner that the rotational speed of the second electric machine EM2 increases and the rotational speed of the first electric machine EM1 decreases. For this, preferably the torque of the second electric machine EM2 is increased somewhat—if possible—and at the same time the torque of the first electric machine EM1 is somewhat reduced. The target rotational speed of the first ring gear shaft HR1, which corresponds to the rotational speed of the second electric machine EM2, is the rotational speed of the second carrier shaft ST2 so that the second shifting element B is synchronized. As soon as the second shifting element B is synchronous it can be closed. The torques of the first and second electric machines EM1, EM2 can now be apportioned in any desired way, since a fixed gear, namely the second gear, is engaged. If necessary the second electric machine EM2 can be decoupled from the first ring gear shaft HR1. If the full drive power is wanted, the second electric machine EM2 can also be connected to the transmission input shaft EW or the first sun shaft SO1.

The powershift process when shifting from the second to the third gear, in which process the second shifting element B is opened and the third shifting element C is closed, takes place analogously to the shifting process from the first to the second gear and is described in detail below.

Starting from the situation that the second electric machine EM2 has previously been connected to the transmission input shaft EW, i.e. the two electric machines EM1, EM2 together are driving, the load on the second electric machine EM2 is first reduced. Then, the second coupling element E of the coupling device KE is opened and the first coupling element D is synchronized with the second electric machine EM2. The first coupling element D is then closed and the second electric machine EM2 is connected to the first ring gear shaft HR1. After that a torque is built up by the second electric machine EM2 so that the second shifting element B is relieved. If the second electric machine EM2 cannot deliver enough torque, the torque of the first electric machine EM1 is correspondingly reduced. Then the second shifting element B is opened. The torques of the first and second electric machines EM1, EM2 are controlled or regulated in such manner that the rotational speed of the second electric machine EM2 increases and the rotational speed of the first electric machine EM1 decreases. For this, preferably the torque of the second electric machine EM2 is increased somewhat—if possible—and at the same time the torque of the first electric machine EM1 is reduced somewhat. The target rotational speed of the first ring gear shaft HR1, which corresponds to the rotational speed of the second electric machine EM2, is the rotational speed of the first carrier shaft ST1 or the second sun shaft SO2, so that the third shifting element C is synchronized. As soon as the third shifting element C is synchronous, it can be closed. The torques of the first and second electric machines EM1, EM2 can now be apportioned as desired, since a fixed gear, namely the third gear, is engaged. If necessary the second electric machine EM2 can be decoupled from the first ring gear shaft HR1. If the full drive power is wanted, the second electric machine EM2 can also remain connected to the first ring gear shaft HR1. Since in the third gear the first planetary gearset PS1 rotates as a block, a coupling shift of the second electric machine EM2 from the first ring gear shaft HR1 to the transmission input shaft EW is not necessary since all three shafts have the same rotational speed during block rotation.

Downshifts take place analogously, only in the reverse direction of the rotational speeds of the first and second electric machines EM1, EM2.

Overdrive shifts take place analogously, only with reversed torques of the first and second electric machines EM1, EM2.

FIG. 2 shows, as a further example embodiment of the invention, a drive arrangement 2 with a drive unit 2a and a vehicle axle 2b as a central drive. For the same components the same indexes are used as in FIG. 1. Otherwise compared with the drive arrangement 1 according to FIG. 1, the manual transmission here is in the form of a two-gear transmission G2 and a shifting device SE2 has only two shifting elements, the second shifting element B and the third shifting element C. Thus, compared with the three-gear transmission G3 in FIG. 1, the first shifting element A is omitted. The first and second gears are engaged by means of the two shifting elements B, C. With the second shifting element B closed, the first ring gear shaft HR1 is connected to the second carrier shaft ST2; the first and second planetary gearsets PS1, PS2 are then coupled twice to one another and superposition operation takes place with an epicyclic gear ratio. The second gear is formed by closing the third shifting element C, whereby the first planetary gearset PS1 is blocked. In the example embodiment shown, the first ring gear shaft HR1 and the first carrier shaft ST1 are coupled to one another. During block rotation all three shafts have the same rotational speed. There are two further possible blocking variants for the first planetary gearset PS1: ring gear shaft with the sun shaft, or carrier shaft with the sun shaft, but in the latter case an additional sliding sleeve would be needed.

The transmission output shaft AW of the two-gear transmission G2, the second carrier shaft ST2, is connected by the bevel drive KT to the axle differential DI by way of which the drive wheels R1, R2 are driven by the differential output shafts 3a, 3b. The drive unit 2a is thus connected to the vehicle axle 2b via the transmission output shaft AW, and can therefore be arranged any desired distance from the vehicle axle 2b, for example in a "central" position in the electric vehicle.

INDEXES

1 Drive arrangement
1a Drive unit
1b Vehicle axle
2 Drive arrangement
2a Drive unit
2b Vehicle axle
3a Differential output shaft
3b Differential output shaft
A First shifting element
AK1 Actuator
AK2 Actuator
AW Transmission output shaft
a1 Wheel axle (R1)
a2 Wheel axle (R2)
B Second shifting element
C Third shifting element
D First coupling element
DI Axle differential
DIK Differential cage/input
E Second coupling element
EM1 First electric machine
EM2 Second electric machine
EW Transmission input shaft
G2 Two-gear transmission
G3 Three-gear transmission
HR1 First ring gear shaft (PS1)
HR2 Second ring gear shaft (PS2)
KE Coupling device
KT Bevel drive
KT1 Pinion
KT2 Crown wheel
m Rotational axis (EM1, EM2)
PS1 First planetary gearset
PS2 Second planetary gearset
R1 Drive wheel
R2 Drive wheel
RO1 Rotor (EM1)
RO2 Rotor (EM2)
SE2 Shifting device (G2)
SE3 Shifting device (G3)
SM Sliding sleeve
SO1 First sun shaft (PS1)
SO2 Second sun shaft (PS2)
ST1 First carrier shaft (PS1)
ST2 Second carrier shaft (PS2)

The invention claimed is:

1. A drive arrangement for an electric vehicle, comprising:
first and second drive wheels with wheel axles,
a first electric machine and a second electric machine with a common rotational axis,
a manual transmission with a transmission input shaft and a transmission output shaft,
an axle differential with a differential input and two differential output shafts,
the first electric machine being connected to the transmission input shaft, and the transmission output shaft being connected to the differential input,
the second electric machine being engagable as an additional drive,
the manual transmission having first and second planetary gearsets coupled with one another, the first planetary gearset comprises a first sun shaft, a first ring gear shaft and a first carrier shaft and the second planetary gearset comprises a second sun shaft, a second ring gear shaft and a second carrier shaft, the first ring gear shaft is disengagably connectable to the second carrier shaft and the second ring gear shaft is continually fixed to a housing, and a coupling device having first and second independently engagable coupling elements, the second electric machine is couplable to the transmission input shaft and the first sun shaft by engagement of the first coupling element, the second electric machine is couplable to the first ring gear shaft by engagement of the second coupling element.

2. The drive arrangement according to claim 1, wherein the transmission is a three-gear transmission with a first shifting element, a second shifting element and a third shifting element, the first carrier shaft is solidly connected to the second sun shaft, the first sun shaft forms the transmission input shaft, the second carrier shaft forms the transmission output shaft and the first shifting element is actuatable to engage a first gear, the second shifting element is actuatable to engage a second gear, and the third shifting element is actuatable to engage a third gear.

3. The drive arrangement according to claim 2, wherein the first ring gear shaft is disengagably connectable to the housing by engagement of the first shifting element.

4. The drive arrangement according to claim 2, wherein the first planetary gearset is blocked by engagement of the third shifting element in such a manner that the first ring gear shaft is couplable to the first carrier shaft and to the second sun shaft.

5. The drive arrangement according to claim 2, wherein the first, the second and the third shifting elements are unsynchronized claw shifting elements.

6. The drive arrangement according to claim 2, wherein at least one of the first, the second and the third shifting elements is integrated in a sliding sleeve and the sliding sleeve is movably arranged on the first ring gear shaft.

7. The drive arrangement according to claim 6, wherein the sliding sleeve is actuatable by an actuator.

8. The drive arrangement according to claim 1, wherein the transmission is a two-gear transmission with a second shifting element, a third shifting element the first carrier shaft is connected fixed to the second sun shaft, the first sun shaft forms the transmission input shaft, the second carrier shaft forms the transmission output shaft and the second shifting element is actuatable to engage a first gear, and the third shifting element is actuatable to engage a second gear.

9. The drive arrangement according to claim 8, wherein the first ring gear shaft is couplable to the second carrier shaft by engagement of the second shifting element.

10. The drive arrangement according to claim 8, wherein the first planetary gearset is blocked by engagement of the third shifting element in such a manner that the first ring gear shaft is couplable to the first carrier shaft and the second sun shaft.

11. The drive arrangement according to claim 1, wherein the transmission comprises neutral positions in which the first electric machine is decoupled.

12. The drive arrangement according to claim 1, wherein the coupling device is shiftable to first and second coupling positions and a neutral position, and, in the neutral position of the coupling device, the second electric machine is disengaged from the first planetary gearset by disengagement of the first and the second coupling elements.

13. The drive arrangement according to claim 12, wherein, in the first coupling position of the coupling device, the second electric machine is coupled to the transmission input shaft and the first sun shaft by engagement of the first coupling element and the second electric machine is decoupled from the first ring gear shaft by disengagement of the second coupling element.

14. The drive arrangement according to claim 12, wherein, in the second coupling position of the coupling device, the second electric machine is rigidly coupled to the first ring gear shaft by engagement of the second coupling element.

15. The drive arrangement according to claim 12, wherein, in the neutral position of the coupling device, the second electric machine is decoupled from the first ring gear shaft and the first sun shaft.

16. The drive arrangement according to claim 1, wherein the wheel axles and the differential output shafts are arranged perpendicularly to the rotational axis of the first and the second electric machines, and the axle differential is drivable via a bevel drive by the transmission output shaft.

17. A method of carrying out shifts under load by shifting elements and the coupling elements of the drive arrangement, according to claim 1, the method comprising:

operating the first electric machine as a main drive machine, and utilizing the second electric machine for supporting traction force during shifting processes.

18. The method according to claim 17, further comprising preparing for a shift from a first gear to a second gear or from the second gear to a third gear by coupling the first ring gear shaft to the second electric machine.

19. The method according to claim 17, further comprising using the second electric machine to bring about synchronization during the shifting processes.

20. The method according to claim 17, further comprising, after an end of the shifting processes, decoupling the second electric machine.

21. A drive arrangement for an electric vehicle, comprising:

first and second drive wheels with wheel axles, a first electric machine and a second electric machine with a common rotational axis, a manual transmission with a transmission input shaft and a transmission output shaft, and an axle differential with a differential input and two differential output shafts, the first electric machine being connected to the transmission input shaft, and the transmission output shaft being connected to the differential input, and the second electric machine being engagable as an additional drive, the transmission is a three-gear transmission with a first shifting element, a second shifting element and a third shifting element and first and second planetary gearsets coupled with one another, the first planetary gearset comprises a first sun shaft, a first ring gear shaft and a first carrier shaft and the second planetary gearset comprises a second sun shaft, a second ring gear shaft and a second carrier shaft, the first carrier shaft is solidly connected to the second sun shaft, the first sun shaft forms the transmission input shaft, the second ring gear shaft is held fixed, the second carrier shaft forms the transmission output shaft and the first shifting element is actuatable to engage a first gear, the second shifting element is actuatable to engage a second gear, and the third shifting element is actuatable to engage a third gear, and the first ring gear shaft is couplable to the second carrier shaft by engagement of the second shifting element.

* * * * *